United States Patent [19]

Dean et al.

[11] Patent Number: 4,676,806
[45] Date of Patent: Jun. 30, 1987

[54] TEMPERATURE SENSITIVE CONTROL SYSTEM FOR LIQUID MOTOR AND PUMP IN A NATURAL GAS DEHYDRATION SYSTEM

[76] Inventors: Alvin Dean, 1302 N. Kirby, Bloomfield, N. Mex. 87413; Rodney T. Heath, 4901 E. Main, Farmington, N. Mex. 87401

[21] Appl. No.: 835,279

[22] Filed: Mar. 3, 1986

[51] Int. Cl.⁴ .................. B01D 19/00; B01D 53/14
[52] U.S. Cl. .......................... 55/20; 55/32; 55/160; 55/185; 417/32
[58] Field of Search .............. 55/20, 32, 160, 185, 55/220; 417/32, 292, 404

[56] References Cited

U.S. PATENT DOCUMENTS

| | | | |
|---|---|---|---|
| 2,990,910 | 7/1961 | Kimmell | 55/38 X |
| 3,094,574 | 6/1963 | Glasgow et al. | 55/32 X |
| 3,206,916 | 9/1965 | Glasgow et al. | 55/20 |
| 3,288,448 | 11/1966 | Patterson et al. | 261/152 |
| 3,405,509 | 10/1968 | Coggins | 55/160 |
| 3,446,709 | 5/1969 | Marshall | 55/160 X |
| 3,451,897 | 6/1969 | Welch | 55/20 X |
| 3,470,069 | 9/1969 | Bracken et al. | 55/20 X |
| 3,541,763 | 11/1970 | Heath | 55/185 |
| 4,198,214 | 4/1980 | Heath | 55/20 |
| 4,257,395 | 3/1981 | Wieder | 417/32 X |
| 4,257,745 | 3/1981 | Thur et al. | 417/32 X |
| 4,286,929 | 9/1981 | Heath et al. | 417/404 |
| 4,342,572 | 8/1982 | Heath | 55/160 |
| 4,402,652 | 9/1983 | Gerlach et al. | 417/404 |
| 4,427,420 | 1/1984 | Reid | 55/20 X |
| 4,511,374 | 4/1985 | Heath | 55/32 X |
| 4,588,424 | 5/1986 | Heath et al. | 55/208 |

*Primary Examiner*—Robert Spitzer
*Attorney, Agent, or Firm*—Klaas & Law

[57] ABSTRACT

A liquid pump motor is driven by pressurized wet glycol, received from an absorber of a natural gas dehydrating system, and utilizes the energy of the pressurized wet glycol to provide the primary source of energy for operating a pump for pumping of dry glycol from a reboiler to the absorber. A first manual control valve normally regulates the stroking rate of the glycol driven pump motor. The pump is also automatically regulated by a control system sensitive to temperature changes in the circulating glycol in order to lower the circulation rate of glycol under certain operating conditions to prevent overheating of the glycol circulation system.

4 Claims, 9 Drawing Figures

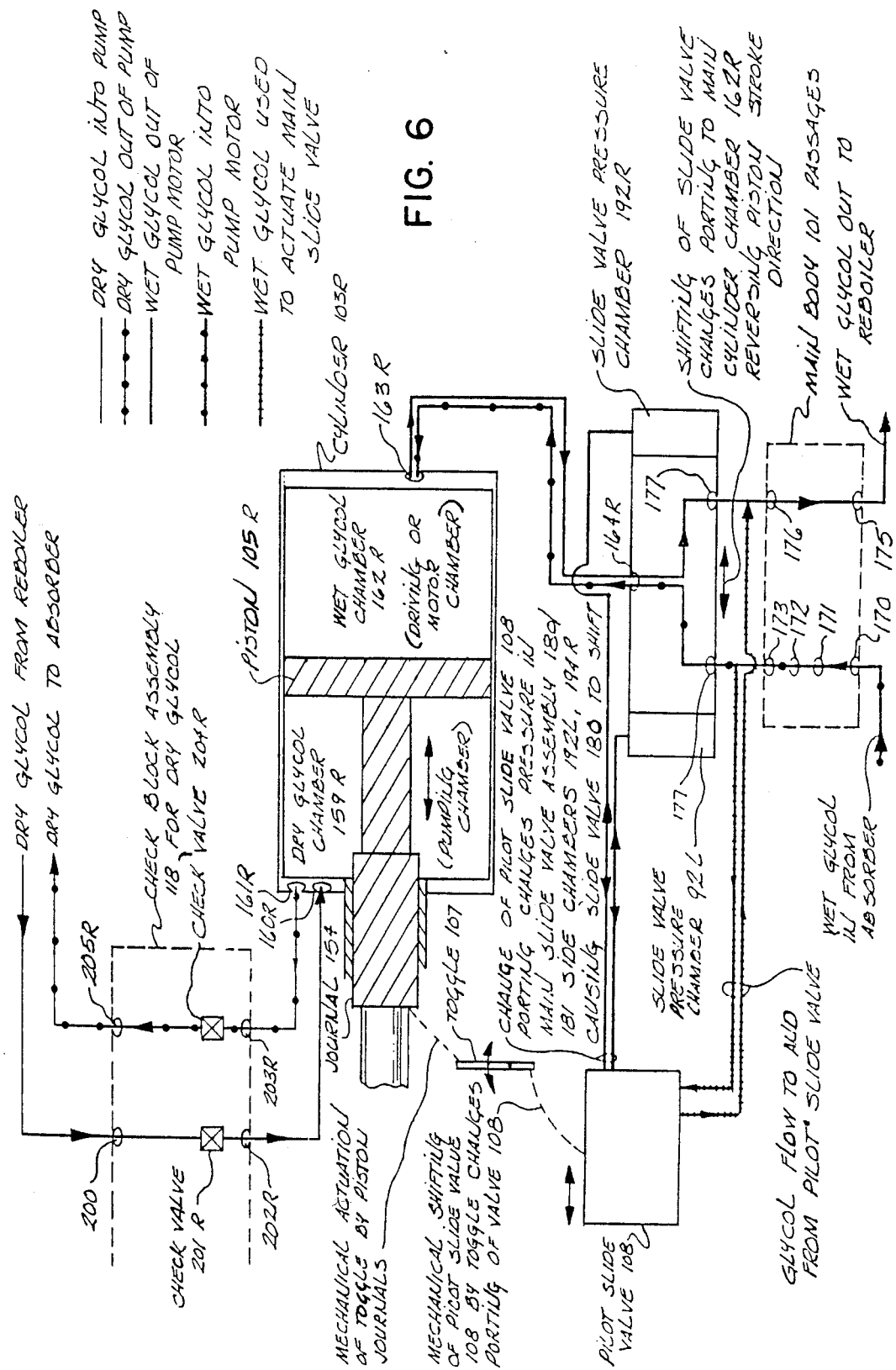

TEMPERATURE SENSITIVE CONTROL SYSTEM FOR LIQUID MOTOR AND PUMP IN A NATURAL GAS DEHYDRATION SYSTEM

BACKGROUND AND SUMMARY OF THE INVENTION

This invention relates to a fluid pumping system and, more particularly, to a fluid pumping system adapted for use with a natural gas dehydrating system of the type employed at a gas well head to remove water from a well stream composed of a mixture of gas, oil and water.

Examples of such gas dehydrating systems are disclosed in U.S. Pat. Nos. 3,094,574; 3,288,448; 3,541,763; 4,402,652 and U.S. Pat. application Ser. No. 661,398 filed Oct. 16, 1984, now U.S. Pat. No. 4,588,434,by Charles Richard Gerlach and Rodney Thomas Heath; the disclosures of which are specifically incorporated herein by reference. In general, such systems comprise a separator means for receiving the oil and water liquids from "wet" (water vapor laden) gas; and a water absorber means, which employs a liquid dehydrating agent such as glycol, for removing the water vapor from the wet gas and producing "dry" gas suitable for commercial usage. The glycol is continuously supplied to the absorber means in a "dry" low water vapor pressure condition and is removed from the absorber means in a "wet" high water vapor pressure condition. The wet glycol is continuously removed from the absorber means and circulated through a reboiler means, which includes a still column, for removing the absorbed water from the glycol and heating the glycol to provide a new supply of hot dry glycol. Heating of the glycol in the reboiler means is generally accomplished through use of a gas burner mounted in a fire tube. The hot dry glycol from the reboiler means passes through a heat exchanger, where the hot dry glycol transfers some of its heat to incoming wet glycol going to the still column. The dry glycol subsequently passes to a dry glycol storage tank. A glycol passage means is provided to enable passage of wet glycol from the absorber means to the reboiler means and to pump dry glycol from the storage tank to the absorber means.

As described in U.S. Pat. Nos. 4,286,929 and 4,402,652, the disclosure of which is hereby incorporated herein by reference, motors for glycol pumps of natural gas dehydrating systems have heretofore been designed to be operated by the energy of natural gas available at the well head due to the relatively high pressures and temperatures thereof. In addition, the energy of the wet glycol has been used to drive a single piston pump for the dry glycol as disclosed in U.S. Pat. No. 3,093,122 to Sachnik dated June 11, 1963. This pumping unit uses a fluid driven power piston, and a pilot valve driven by the same fluid controls the rate of operation of the master slide valve, which distributes fluid to the piston pump.

One of the problems with pump designs has been that the pressure of the gas stream from natural gas wells is highly variable and pumps have often required large amounts of energy. Furthermore, changes in gas pressures during day to day operation have often caused stalling of the pump and interruption of the entire dehydrating system. Since the dehydrating systems are continuously operated at the well site without continuous monitoring by operating personnel, reliable continuous operation of the pump is of critical importance.

The pumping units described in U.S. Pat. No. 4,286,929; U.S. Pat. No. 4,402,652 and U.S. Pat. application, Ser. No. 661,398 filed Oct. 16, 1984, now U.S. Pat. No. 4,588,434 of Charles Gerlach and Rodney Heath (all of which are hereby specifically incorporated by reference for all that is disclosed therein) have proven to be highly efficient and require only relatively small amounts of gas to drive the pumps. Such pumps are less subject to stalling at lower operating speeds than earlier pumps and are effective over a relatively wide range of operating conditions. However, problems still occur when gas flow drops to zero or low flow rates as a result of high line pressure, stopcocking, line freezes, etc. During these no-flow or extremely low flow conditions, energy is consumed by the pump to circulate glycol and energy is also consumed by the burner to heat the circulating glycol. Since little or no gas to glycol heat exchange occurs under these conditions, the glycol and associated containment vessels can reach elevated temperatures. The results of such overheating are premature pump and packing failures as well as loss of glycol through the still column and unnecessary gas consumption. Further, when gas flow is reestablished, it may take several hours for the unit to cool sufficiently to operate effectively. One solution to this problem, discussed in U.S. Pat. No. 4,402,652, is to install a pump shut down device to terminate pumping operations under gas no-flow conditions. An orifice meter is located in the well gas line and actuates a shut off valve in the supply gas line to terminate pump operation. One drawback is that pump start-up subsequent to a termination of operations may be unreliable. Another problem is that such a system, in some situations, does not provide an appropriate response to fluctuating extreme conditions. For example, if the well gas flow were only briefly interrupted it would be undesirable to terminate pumping and, on the other hand, a substantially reduced well gas flow rate which might produce elevated heating conditions after a relatively long period of time might not be of a sufficiently low flow rate to trigger the pump shut off mechanism.

Thus, a need exists for providing a control system which is capable of preventing overheating of a glycol type dehydration system under certain conditions associated with reduced gas flows and which provide an appropriate response to such conditions in all situations to provide optimum system operation.

BRIEF DESCRIPTION OF THE DRAWINGS

The present invention is illustrated in the accompanying drawing wherein:

FIG. 6 is a schematic illustration of the operation of a right hand portion of the pump and pump motor assembly of FIG. 2.

DETAILED DESCRIPTION OF THE INVENTION

Figure 1:
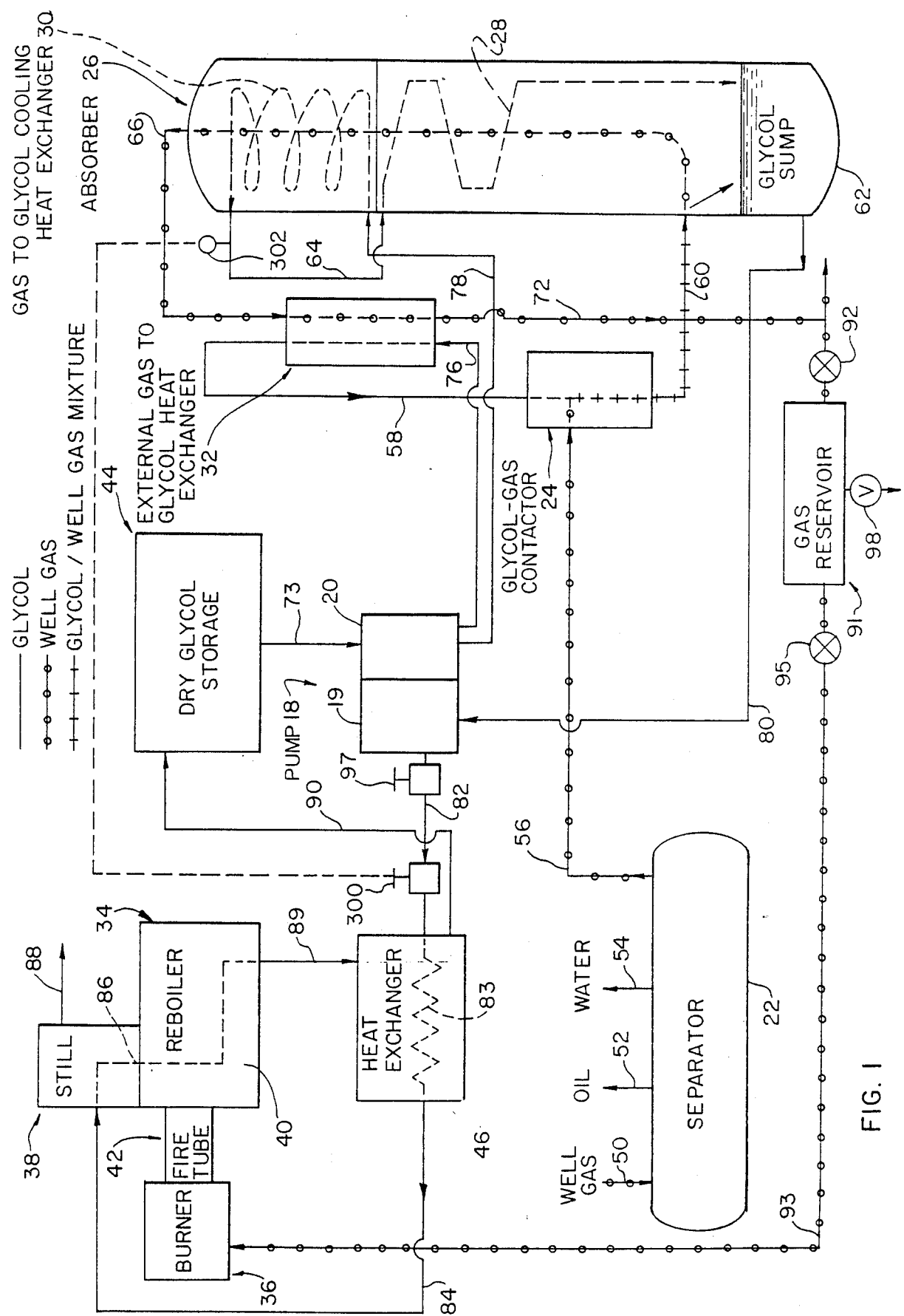
FIG. 1 is a schematic diagram of a pumping system in use in a natural gas dehydrating system.

Referring to FIG. 1, a double acting pump means 18 having wet glycol receiving chamber portions 19 and dry glycol receiving chamber portions 20 is shown in association with the major components of a three-phased dual-contact conventional natural gas dehydration system comprising: a gas-liquid separator means 22 for removing oil and water liquids from water vapor laden well gas; a packed glycol-gas contactor means 24 for first stage removal of water vapor from the well gas by contacting the well gas with dry glycol during concurrent downward flow thereof; an absorber means 26 for second stage removal of water vapor from the well gas, including an internal tray stack means 28 for providing a downward gravity flow of dry glycol with upward counter flow of the well gas therethrough and an internal gas-glycol heat exchanger means 30 for cooling of dry glycol prior to entry of the dry glycol into the stack tray means 28; an external gas-glycol heat exchanger means 32 for cooling the dry glycol prior to entry into the glycol-gas contactor means; a glycol reboiler means 34 for receiving wet glycol and discharging hot dry glycol, including a still column means 38 for separating the water and the glycol by vaporizing the water, a reboiler tank means 40 for holding and heating the partially dry glycol received from the still column means, and a gas burner means 36 and firetube means 42 in the reboiler tank means 40 for heating the partially dry glycol; a dry glycol storage tank means 44 for storing the dry glycol prior to return to the absorber means; and a glycol-glycol heat exchanger means 46 for cooling the hot dry glycol from the reboiler means before entry into the storage tank means while preheating the wet glycol from the absorber means before entry into the reboiler means.

In operation of the system of FIG. 1, well gas under pressure enters separator means 22 through an inlet line 50. The well gas is separated into liquid oil, water and wet gas which includes the natural gas and water vapor. Liquid oil and water are removed from the separator through outlet lines 52, 54. Wet gas under pressure is transmitted through a line 56 to the packed glycol-gas contactor means 24 whereat dry glycol from a line 58 is mixed with the wet gas. The dry glycol and wet gas flow downwardly through contactor means 24 wherein the dry glycol absorbs a portion of the water vapor. Wet glycol and partially dry gas are removed from the contactor means through a line 60 which is connected to the lower end of absorber means 26 between a wet glycol sump 62 at the bottom of the absorber means and stacked tray means 28. Wet glycol from line 60 flows downwardly into the glycol sump 62. Partially dry gas flows upwardly in the absorber through the stacked tray means 28 which provides a downward flow path for dry glycol received from line 64 on the outlet of gas to glycol heat exchanger coil 30. In this manner, additional amounts of water vapor are removed from the gas which then flows upwardly around gas to glycol heat exchanger coil 30 to an outlet line 66 and then downwardly through heat exchanger means 32 to a pipeline 72 which contains dry saleable natural gas at relative high pressures of, for example, 50 psi to 1000 psi.

The dry glycol is delivered from storage means 44 to the packed gas-glycol contactor means 24 and the absorber means 26 under pressure through a pump suction line 73, pump dry glycol chambers 20, pump outlet lines 76, 78 extending through heat exchangers 32, 30, respectively, and inlet lines 58, 64, respectively. Wet glycol is exhausted from the glycol sump 62 to pump 18 wet glycol chambers 19 through line 80 and delivered to the still column 38 of reboiler means 34 through a line 82, glycol-glycol heat exchanger means 46, and a line 84. Wet glycol flows downwardly in the still column means 38 toward reboiler tank means 40 as indicated by dashed line 86. The water in the glyco is vaporized by heat obtained from gas burner means 36 through firetube means 42 which extends into the tank means 40. Vaporized water in the form of steam is removed from the upper end of still column means 38 through an outlet line 88. Hot dry glycol is collected in tank means 40, flows downwardly through a line 89 into the top of heat exchanger means 46 containing glycol heating coil means 83. Cooled dry glycol is transmitted from the bottom of the heat exchanger means 46 containing glycol heating coil means 83. Cooled dry glycol is transmitted from the bottom of the heat exchanger tank to the upper portion of dry glycol storage means 44 through a line 90.

A gas reservoir means 91 is connected to dry gas line 72 by a regulator means 92 which maintains a supply of relatively low pressure (e.g. 75 psig) dry gas in reservoir means 91. Burner 36 is connected to reservoir 91 by a dry gas line 93 through a regulator means 95, which reduces the pressure of dry gas to approximately 10 psi. Gas reservoir 91 has a pressure relief valve 98 to control dry gas pressure therein.

The wet high pressure glycol from line 80 and glycol sump 62 which powers the pump 18 is manually controlled by control valves 97 positioned in pump discharge line 82 to restrict the flow of the wet high pressure glycol and therefore control the speed of the pump. A pump speed is selected to match the dehydrator drying requirements for the gas flow rate at the well head at which the system is used. An additional automatically controlled motor valve 300 is positioned in line 82 downstream of pump 18 wet glycol discharge port. Under normal operating conditions, control valve 300 remains in a fully open state. However, when operating conditions cause a significant reduction in gas flow, the temperature of the dry glycol in gas-to-glycol heat exchanger coil 30 will become elevated to a temperature 30°-60° F. above the flowing gas temperature. A conventional throttling thermostat 302 installed on the dry glycol outlet of gas-to-glycol heat exchanger coil 30 is actuated by an elevation in temperature of the exiting dry glycol to a preselected maximum temperature. Once the preselected maximum temperature is reached, thermostat 302 adjustably closes control valve 300, thereby reducing the pumping rate of pump 18. The pumping speed is reduced to the level necessary to prevent the temperature of the dry glycol measured at thermostat 302 from rising above the preselected maximum temperature. The glycol pumping system remains operating at a reduced pump speed until an increase in the gas flow causes a reduction in the temperature of dry glycol exiting from coil 30 to a temperature below the preselected maximum temperature. When the temperature of the exiting dry glycol drops below the preselected maximum temperature, the control valve 300 is progressively opened by the thermostat 302 to the full-open operating condition. The valve 300 will remain in this full-open operating condition until a well gas no-flow or reduced flow situation producing an elevation in the temperature of the exiting dry glycol beyond the preselected maximum temperature causes the above described control cycle to be repeated.

Figure 2:
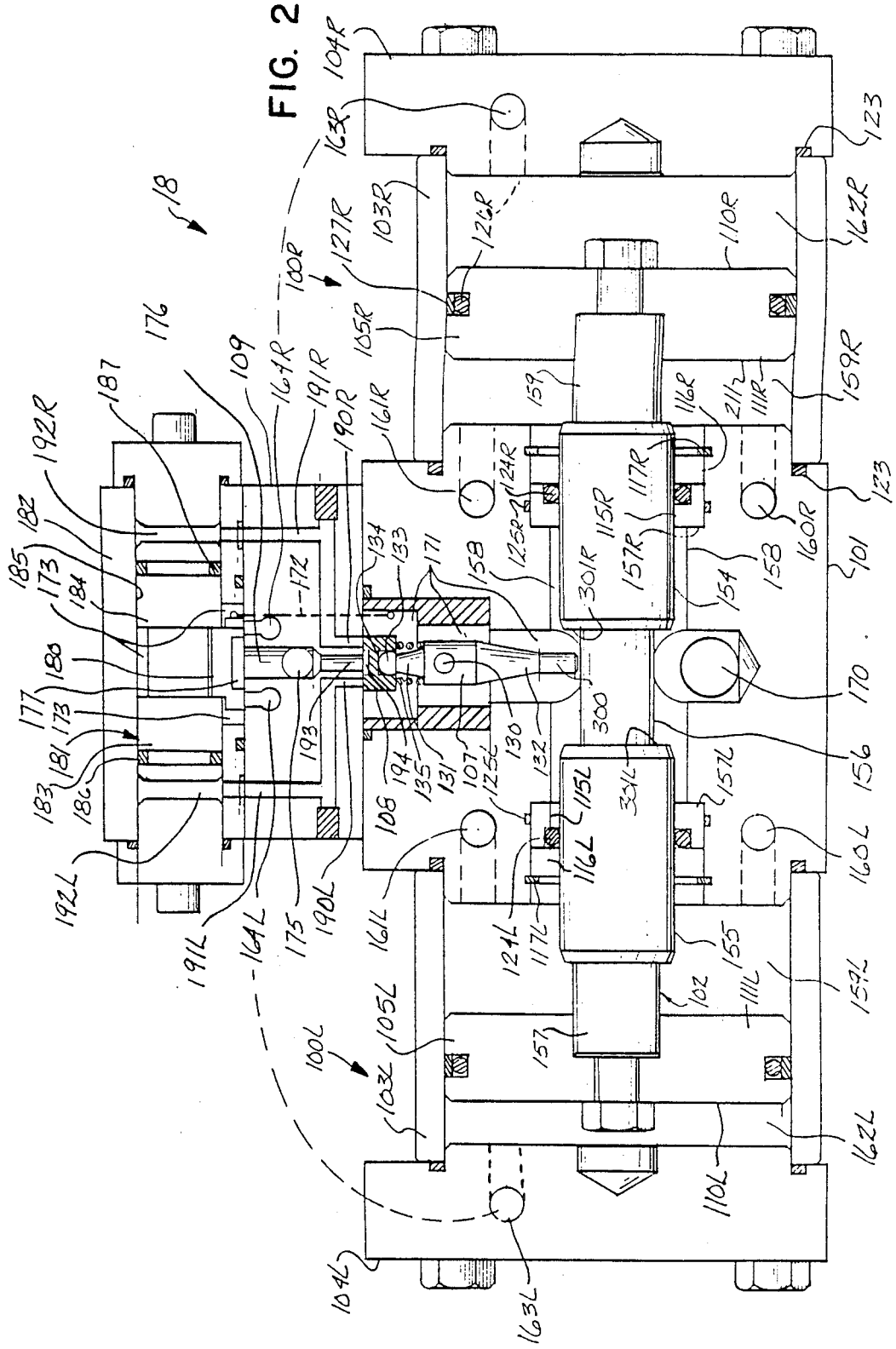
FIG. 2 is a cross sectional view of a portion of a glycol pump and pump motor assembly.

As shown in FIG. 2, the double acting pump means 18 may include two pump/pump motor sections 100L, 100R positioned opposite of each other on a central main body 101. The right pump/motor section 100R comprises a cylinder 103R which is mounted on the main body 101 and which is concentrically located about a piston shaft 102 which extends through a bore 158 in the main body 101. The right hand pump/motor section also comprises a right piston 105R which is conventionally bolted to shaft 102. A cylinder end cap 104R is bolted to the main body and axially clamps the cylinder 103R in fixed relationship with main body 101. Seal rings 123 provided in a groove in a shoulder portion of the main body 101 and in a groove in the end cap 104R form a seal at both ends of cylinder 103R to prevent leakage of fluid out of the cylinder.

The right piston 105R is free to move axially within the cylinder 103R and is slidingly sealed against the cylinder by O-ring 126R and seal ring 127R. A left piston 105L is similarly constructed and arranged with respect to a left cylinder 103L and left end cap 104L.

Figure 7:
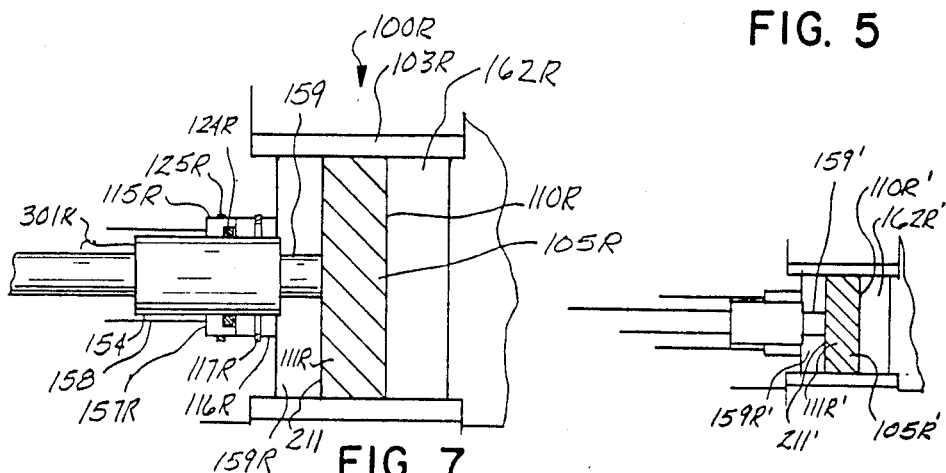
FIG. 7 is a partial cross sectional view of a pump and pump motor assembly utilizing a relatively small journal member.
Figure 9:
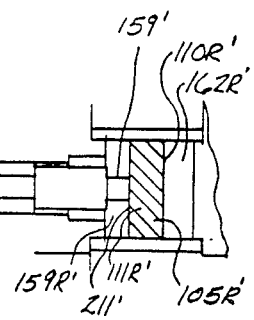
FIG. 9 is a partial cross sectional view of a pump and pump motor assembly utilizing a piston and cylinder of relatively smaller diameter than shown in FIGS. 7 and 8.
Figure 8:
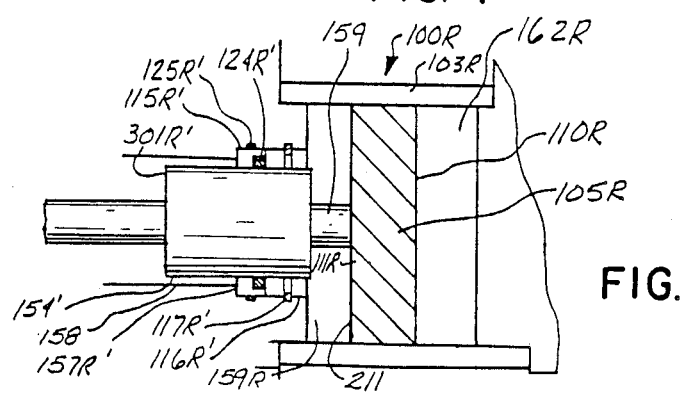
FIG. 8 is a partial cross sectional view of a pump and pump motor assembly utilizing a relatively large journal member.

The piston shaft 102 comprises two enlarged removably mounted journal portions 154 and 155 separated by a reduced diameter section 156 and spaced inwardly from smaller diameter end portions 157, 159 which are bolted to pistons 105L, 105R. The pushrod journal 154 is slidably sealed in the right end of the main body by a journal seal means including seal ring 124R which is housed and held in the main body 101 by seal retainer 115R and seal spacer 116R. Seal retainer 115R is in turn sealingly engaged by groove mounted seal ring 125R. Snap ring 117R holds seal retainer 115R and seal spacer 116R in place in main body 101 against the shoulder 157R of pushrod bore 158. Similarly, the pushrod journal 155 is sealed by seal ring 124L which is housed in seal retainer 115L which is engaged by seal ring 125L and is held in place against shoulder 157 by seal spacer 116L and snap ring 117L. It is a feature of the present invention that the journals and journal seal means are readily removable and replaceable by larger or smaller diameter journals to enable the effective surface area of the inner face of an associated piston to be selectively varied, as discussed in further detail below. The use of different sized journals is illustrated in FIGS. 7 and 8 wherein a relatively small journal used in FIG. 7, and a relatively larger journal and seal (having component parts designated by reference numerals with a prime) is used in FIG. 8. Similarly, as shown in FIGS. 7 and 9, the cylinders 103L, 103R and pistons, etc. 105L, 105R may be readily replaced with small diameter units 103R', 105R' etc. (only one side shown) to reduce the pumping capacity.

Figure 5:
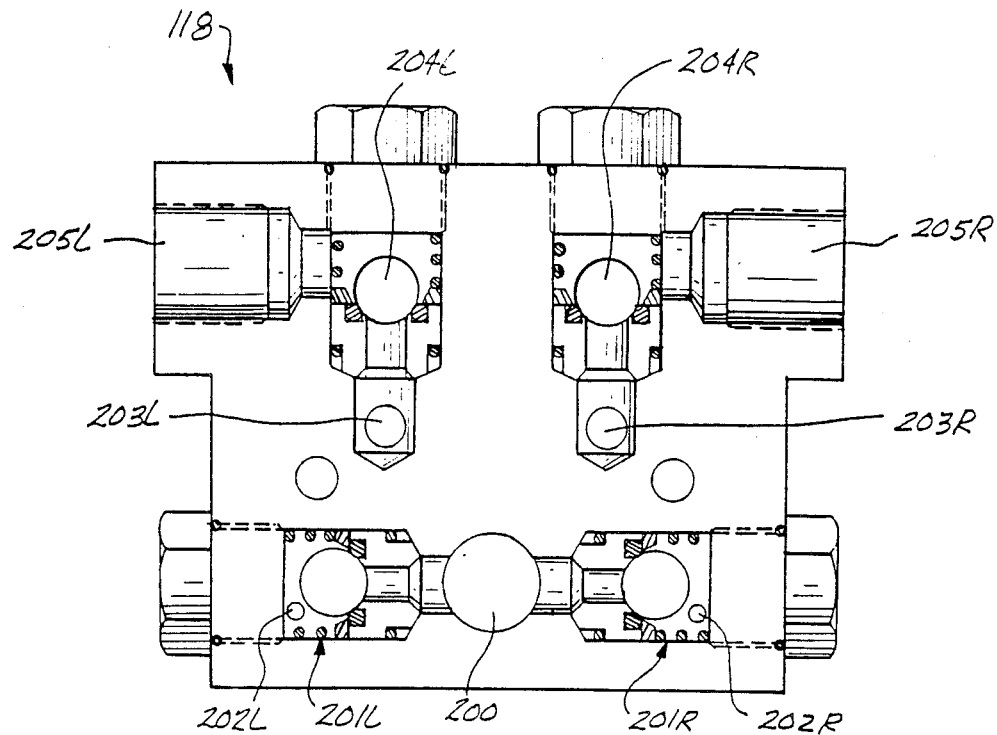
FIG. 5 is a cross sectional view of a check valve block assembly portion of the glycol pump and pump motor assembly illustrated in part in FIG. 2.

Right pump chamber 159R, defined by the portion of the cavity of cylinder 103R positioned between right piston 105R and the main body 101, alternately draws in and expels dry glycol. Fluid is drawn into chamber 159R on a suction stroke through port 160R in main body 101 which connects to port 202R of a check block assembly 118, FIG. 5. In an assembled condition, the check block assembly 118 is bolted to the side of the main body 101. Port 200 of the check block assembly is the main dry glycol suction inlet. Port 200 is connected to two one way valves which, in the preferred embodiment, comprise conventional ball-type check valves 201L, 201R which permit flow from port 200 to the associated dry glycol chambers 159L, 159R but which does not permit a reverse flow therebetween. Dry glycol is drawn into chamber 159R through passages 160R, 202R, FIG. 5 and by check valve 201R which directly communicates with port 200. This flow relationship is illustrated schematically, for the right hand cylinder 105R, in FIG. 6.

Fluid is expelled from chamber 159R on a discharge stroke through port 161R which connects to port 203R of check block assembly 118. Port 203R communicates with check valve 204R which, in turn, allows one way passage of fluid to outlet port 205R.

Similarly, left pump chamber 159L draws a suction charge on a suction stroke from port 200 through check valve 201L and connecting ports 202L and 160L. Left pump chamber 159L discharges fluid through connecting ports 161L and 203L through check valve 204L and outlet port 205L.

Chambers 162R and 162L are motor chambers and alternately receive high pressure wet glycol from the absorber unit and discharge the wet glycol at a low pressure back to the reboiler or other treater as shown schematically in FIG. 6. Control of the wet glycol in and out of each motor chamber 162R and 162L is achieved by a reversible orifice means which may include main slide valve 180, Fig. 2. Slide valve 180 is actuated by a piston 181 sealingly mounted in slide valve cylinder 182. Piston 181 has two medially positioned, enlarged portions 183, 184 which slidingly sealingly engage the inner wall 185 of cylinder 182 as with seal rings 186, 187. Cylinder 182 and enlarged piston portions 183, 184 define variable volume chambers 192L, 192R which are alternately pressurized and depressurized to cause shifting of slide valve 180 between a left hand position and a right hand position as described in further detail below. High pressure wet glycol exerts pressure at all times on to the surfaces of slide valve 180 which define portions of cavities 173. High pressure wet glycol enters the pump/ motor unit through port 170, FIGS. 2 and 6, and then communicates with cavity 173 through passages 171 and 172. If the piston 181 and slide valve 180 is shifted to the left from the neutral position shown in FIG. 2, to the position in FIG. 3, then high pressure wet glycol from port 170 communicates with wet glycol chamber 162R through passages 171 and 172, cavity 173, and connecting passages 164R and 163R.

Port 175, FIG. 2, is the low pressure wet glycol outlet to the reboiler. Port 175 communicates through passage 176 with lower cavity 177 of slide valve 180. With the piston 181 and slide valve 180 shifted to the right, as shown in FIG. 4, and as shown by non-dotted flow lines in FIG. 6, the right motor chamber 162R is placed in communication with wet glycol outlet port 175 through communicating ports 163R and 164R, slide valve cavity 177, and passage 176. Thus, wet glycol is discharged from right motor chamber 162R when slide valve 180 is shifted to the right. Wet glycol is similarly discharged from the left motor chamber 162L then the slide valve 180 is shifted to the left, FIG. 3.

In summary, with the slide valve 180 and actuator piston 181 shifted to the left, high pressure, wet glycol from the absorber is ported to motor chamber 162R and low pressure, wet glycol is exhausted from motor chamber 162L to the reboiler. Similarly, if the actuator piston 181 and slide valve 180 are shifted to the right, as shown in Fig. 4, then high pressure wet glycol is ported to motor chamber 162L and low pressure wet glycol is exhausted from chamber 162R.

The structure and operation of the mechanism used to change the position of slide valve 180 to produce reciprocal motion in the pump/motor will now be described with reference to FIGS. 2, 3, 4 and 6.

Figure 3:
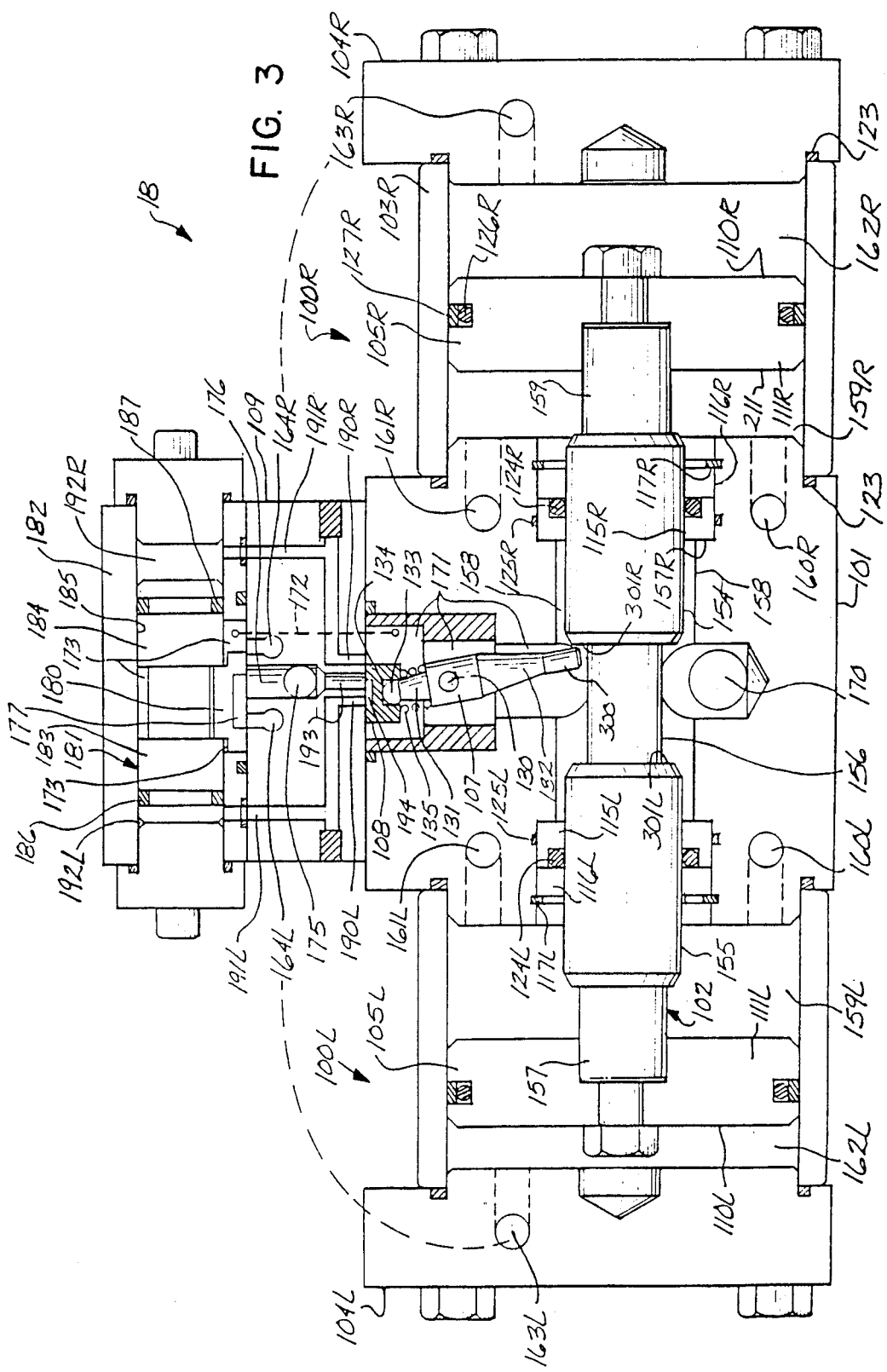
FIG. 3 is a cross sectional view of the portion of the pump and pump motor assembly of FIG. 2 showing a slide valve in a leftwardly shifted position.
Figure 4:
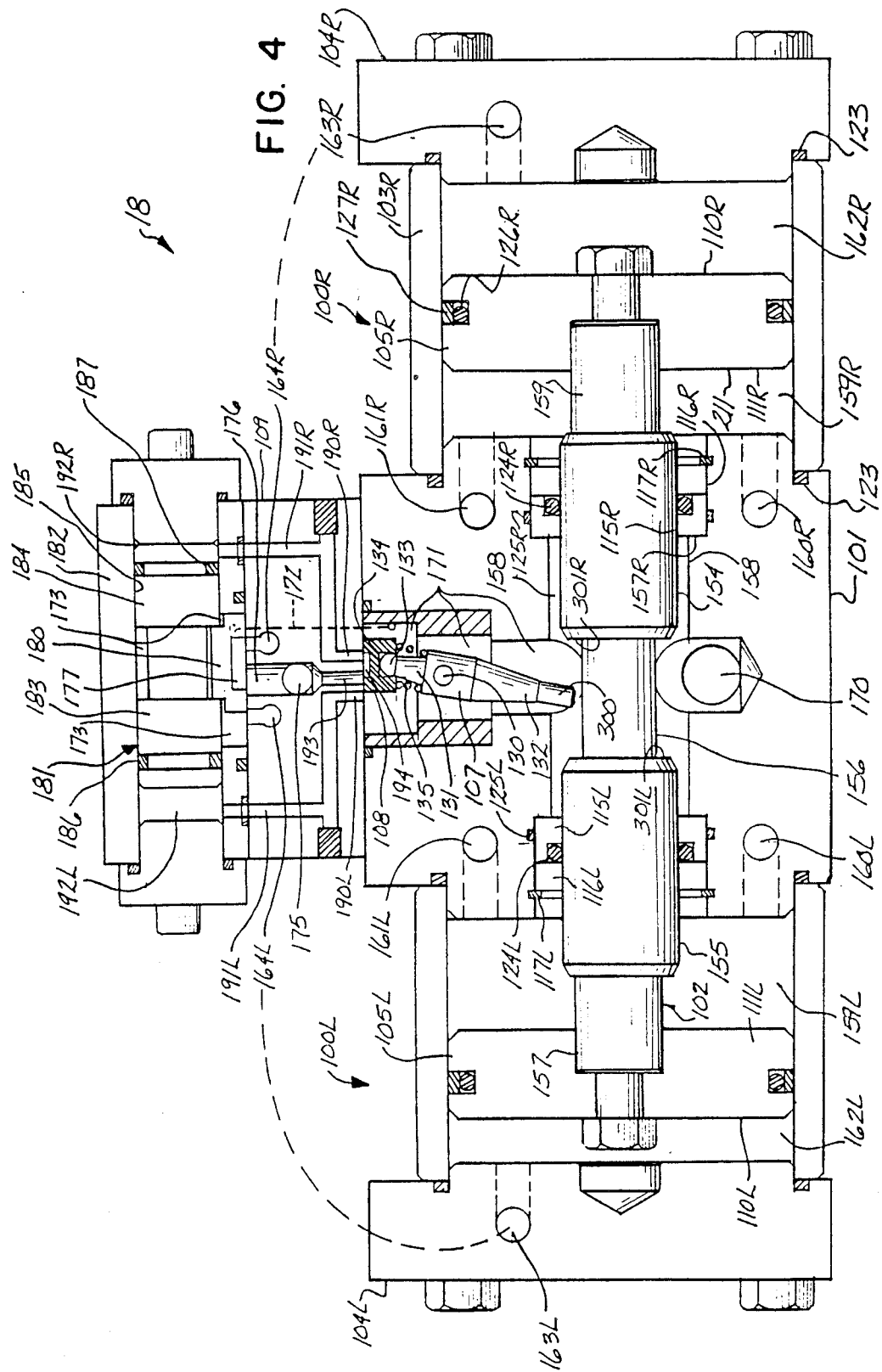
FIG. 4 is a cross sectional view of the portion of the pump and pump motor assembly of FIG. 2 showing a slide valve in a rightwardly shifted position.

As shown in FIGS. 2, 3 and 4, a toggle 107 is pivotally mounted about a pivot axis as by pin 130 in cavity 171 which opens at the lower portion thereof into central body bore 158. The toggle is mounted such that the length of the lever arm 131 formed above the pivot axis is substantially shorter and preferably half or less the length of the lever arm 132 formed below the toggle pivot axis. The upper end portion of the toggle terminates in a ball portion 133 which is swivelly mounted in an open socket position 134 of pilot slide valve 108. Pilot slide valve 108 is biased into planar, slidable, abutting relationship with an upper planar face of cavity 171 with biasing spring 135. Spring 135 is engaged at its lower end with a shoulder portion of toggle 107. Thus rightward shifting of the lower arm 132 of the toggle causes pilot slide valve 108 to slide to the left, as shown in FIG. 3, and leftward shifting of the toggle lower arm 132 causes rightward shifting of pilot slide valve 108 as illustrated in FIG. 4. Applicant has discovered that due to engineering constraints relating to fluid dynamics, etc. the cross-sectional dimensions of lines 190L and 190R cannot be reduced below a diameter of about 0.080 inches, with a separation of about 0.3 inches, and consequently the surface contact are and shifting distance of slide valve 108 cannot be reduced beyond predetermined values that are dependent on the diameters and separation of lines 190L and 190R. As a result of these constraints, the friction generated by movement of the slide valve 108 cannot be reduced beyond a predetermined value, which is dependent on the diameter of lines 190L and 190R, without resorting to the use of exotic and expensive materials which may be unsuitable for use in this environment. Applicant has also discovered that friction caused by movement of slide valve 108 is a primary cause of pump stalling at low operating speeds.

By having the length of lever arm 132 greater than the length of lever arm 131, the force required on tong 300 to shift the lower toggle arm 132 to the right or to the left is reduced. This significantly reduces the total pump friction during shifting which is a primary cause of pump stalling and permits the present device to operate reliably at lower pressures and over a wider pressure range than the device of U.S. Pat. No. 2,990,910 and other prior art pumping units.

This mechanical advantage of the toggle also helps assure reliable restarts when the pump is automatically stopped and started during periodic well "stop clocking". Applicant has discovered that providing a mechanical advantage of at least two to one reduces pump friction sufficiently to allow reliable operation of the unit at pump speeds on the order of 2 or 3 strokes per minute whereas prior art pumping units have generally encountered stalling at any pumping speeds below 10 strokes per minute.

In FIG. 2, the actuator piston 181, the slide valve 180, toggle 107 and pilot slide valve 108 are shown in a centered position. In normal pump operation, the centered position of these components is passed through as the components shift, but the components never stop in this position. FIG. 3 shows a normal shifted operational position of the pump. The toggle 107 is tilted so that the pilot slide valve 108 is shifted to the left. This permits high pressure, wet glycol from passage 171 to communicate through port 190R and passage 191R to pressure chamber 192R of main slide valve cylinder 182. Similarly, with the toggle and pilot slide valve shifted as shown in FIG. 3, low pressure wet glycol in port 175 communicates through port 19 and cavity 194, then through port 191L to pressure chamber 192L allowing exhaust of wet glycol therefrom. Since there is high pressure in chamber 192R on the right side of and low pressure on the left side of main slide valve piston 181, it is shifted to the left as shown in FIG. 3.

With the toggle 107 and pilot slide valve 108, and the actuator piston 181 and main slide valve 180 shifted as shown in FIG. 3, high pressure wet glycol is directed, as indicated previously, to motor chamber 162R and motor chamber 162L is connected to the low pressure wet glycol port 175. In this condition, the piston assembly 102, 105R, 105L, etc. moves to the left pumping dry glycol from chamber 159R through passages 161R and 203R, out through check valve 204R and then through passage 205R to the absorber unit. At the same time, low pressure dry glycol is drawn into pumping chamber 159L from suction port 200 through check valve 201L and through passages 202L and 160L.

Referring to FIG. 3, the wet glycol shifting means for producing stroke reversal in the unit will now be described. For the condition shown in FIG. 3, the toggle 107 is tilted slightly counterclockwise from a true vertical position. The pilot slide valve 108 is thereby shifted to the left causing, as described previously, high pressure wet glycol to force the actuator piston 181 to the left as shown. This results in high pressure wet glycol being ported to motor chamber 162R and low pressure wet glycol ported from motor chamber 162L. With the piston shaft 102 and pistons now moving to the left, contact is eventually made between the tang 300 at the lower end of the toggle 107 and the inward end 301R of piston shaft journal 154. The toggle is subsequently caused to pivot clockwise by further motion of the pushrod 102 until the pilot slide valve 108 is moved to a new position as shown in FIG. 4. When pilot valve 108 occupies the position shown in FIG. 4, high pressure wet glycol is ported to chamber 192L at the left side of the actuator piston 181 and chamber 192R at the right side of actuator piston 181 is ported to the low pressure wet glycol port 175. The actuator piston 181 and slide valve 180 are thereby shifted to the right from the position of FIG. 3 to the new position shown in FIG. 4. This results in motor chambers 162L and 162R being placed in communication with high pressure wet glycol and low pressure wet glycol, respectively. Similarly, chambers 159L and 159R are ported, respectively, to dry glycol suction and to the high pressure dry glycol inlet of the absorber.

The above described motor/pump operating features are summarized schematically in FIG. 6 wherein the dotted lines illustrate an operating condition in which piston 105R is moving to the left, and in which the non-dotted lines illustrate an operating condition in which piston 105R is moving to the right. It will, of course, be understood that a glycol flow opposite to that taking place in the right cylinder 103R will be taking pace simultaneously in the left cylinder 103L.

Normally, the high pressure wet glycol which fills chamber 162R to drive piston 105R and the high pressure dry glycol pumped from chamber 159R are not at exactly the same pressure. Generally, the dry pumped glycol in chamber 159R is at a somewhat higher pressure because of fluid flow line losses and pump friction. Since there is an imbalance of pressures across piston 105R, the greater fluid pressure in chamber 159R must be compensated by using a smaller effective area on the left face of piston 105R than the effective area used on the right face of piston 105R.

It may be seen from FIG. 2 that each piston 105R, 105L has an outwardly directed face 110R, 110L exposed to wet glycol in an interfacing motor chamber 162R, 162L. Each piston also has an oppositely positioned face 111R, 111L exposed to dry glycol in an interfacing pumping chamber 159R, 159L. In the right pump/motor section 100R, the effective piston 105R face 110R area which is exposed to pressure from the fluid in wet glycol (motor) chamber 162R is the full face area of the piston 105R, i.e. the full cross sectional area of chamber 162R. However, the effective area of piston 105R face 111R which is exposed to pressure from the fluid in dry glycol (pump) chamber 159R is equal to the full face area of the piston 105R less the cross sectional area of the piston shaft journal portion 154. Such a difference in effective piston face areas on opposite sides of each piston provides a force imbalance sufficient to overcome friction and flow energy losses to allow pumping of dry glycol to the absorber as explained below.

The wet glycol pressure differential $P_w$ available to power the pump is given by:

$$P_w = P_a - P_{head\ w} - P_{w\ flow\ loss}$$

where $P_w$ = net wet glycol pressure differential available to power pump motor $P_a$ = absorber pressure $P_{head\ w}$ = head pressure difference between the pump motor inlet line 80 at the absorber and the motor outlet discharge line 80 at the still column.

$P_{w\ flow\ loss}$ = wet glycol system total flow loss through lines 80, 82, 83 and 84 and pump motor 19.

The dry glycol pressure differential required of the pump is given by:

$$P_d = a + P_{head\ d} + P_{d\ flow\ loss}$$

where $P_d$ = net dry glycol pressure differential required of the pump.

$P_{head\ d}$ = head pressure difference between the dry glycol storage tank 44 and the uppermost dry glycol head location of absorber unit 26.

$P_{d\ flow\ loss}$ = dry glycol system total flow loss through lines 73, 74, etc. and pump 20.

In general, $P_d$ is always greater than $P_w$ and this difference increases as the pump speed increases.

The wet glycol pressure differential $P_w$ acts across the piston faces 110L, 110R with areas $A_w$ and the dry glycol pressure differentia $P_d$ acts across the piston faces 111L, 111R with areas $A_d$. The net force acting on the rod 102, piston 105L, 105R assembly may now be written as:

$$F\ net = P_w \times A_w - P_d \times A_d - F_F$$

where $F_F$ is the force of friction caused by the seals 124L, 124R, 127L, 127R and by the periodic engagement of the toggle tang 300. In order to have piston motion Fnet must be greater than zero. Since $P_d$ is always greater than $P_w$, $A_w$ must be greater than $A_d$ to allow pump operation. Therefore the force differential which is produced by this difference in effective areas between opposite sides of a piston must be sufficiently large to overcome the frictional losses and flow losses within the system; otherwise no piston movement will take place. On the other hand, if the force differential is too great the piston will be accelerated and decelerated rapidly, thus the unit may pump too rapidly and may damage itself of associated equipment and will use excessive gas.

Providing too great a force differential between opposite sides of a piston may also create another problem as will now be explained. Due to the difference in volumes between the wet glycol (motor or driving) chamber 162R and the dry glycol (pumping) chamber 159R caused by the different effective piston areas, a considerably larger volume of wet glycol is metered through the pump/motor unit than the volume of dry glycol that is being pumped. As explained above, the volume of wet glycol and entrained gas therein is usually significantly greater than the volume of dry glycol because of the water etc. contained in the wet glycol. However, if the friction and flow losses of the system require a relatively large force differential between sides of the piston, the resulting volume differential between the wet glycol and dry glycol chambers may cause the pump to draw more driving fluid from the wet glycol sump than can be made up from wet glycol (and entrained gas) alone. In this event, the pump begins to use well gas as a portion of the driving fluid. Such a result should be avoided to the extent possible since all well gas used in this manner reduced the amount of available sale gas and thus decreased the well yield.

Thus it is generally desirable to provide a pumping system having minimal friction such that the central force differential is fairly low. It is also desirable to provide the necessary force differential while providing a minimal difference in effective volumes between the dry glycol chambers 159L, 159R and wet glycol chambers 162L, 162R. Applicant has discovered that the pump/motor construction described above tends to reduce friction losses because of the relatively small number of moving parts. Applicant has also discovered that a force differential can be produced most efficiently (i.e. with relatively little friction and relatively small volumetric differences between wet and dry glycol chambers) by providing relatively large diameter pistons, e.g., 2 inches to 4 inches with relatively small stroke lengths, e.g., 0.75 inches to 1.1 inches and relatively small journal diameters, e.g., 0.75 inches to 1.2 inches. It has been found that for any given pump cylinder volume a minimum ratio between piston diameter and piston stroke length of 2:1 is desirable and preferably 3:1. It has also been found that the piston diameter should always be substantially greater than the journal diameter; a ratio of at least 1.75:1 and preferably greater than 3:1.

Applicant's unique pump construction also allows the pressure differential between sides of a piston to be easily adjusted in the field such that the pump operates at a speed commensurate with the pressure and temperature requirements at the well head. Adjustment is achieved by providing a plurality of journals 154, 155 having different outer diameters and with a plurality of cylinders 103L, 103R and pistons 105L, 105R having different internal diameters. A pair of journals, each having the same diameter, are inserted in place of an existing journal pair to vary the pumping speed of the pump/motor unit. A larger pair of journals, e.g. FIG. 8, causes a greater force differential between sides of the piston and thus causes faster pumping and increased glycol circulation or operation to lower pressure. A smaller pair of journals, e.g. FIG. 7, reduces pumping speed or increases lower operation pressure and also reduces somewhat the ratio of wet glycol to dry glycol required for pump operation.

Journal replaceability is provided by the use of a relatively large central body bore diameter 158 with respect to push rod 102 diameter, e.g. 2:1. Journal seal assemblies 115, 116, 117, 124, 125 are, of course, provided with a plurality of different internal diameter configurations to accommodate various journal diameters.

The fine adjustment to operational speed of the pump is preferably controlled by restricting the wet glycol flow in lines 164L and 164R, by use of a conventional flow control device such as a needle valve (not shown). As explained above, the course adjustment of pump speed for a given operating condition, i.e., the maximum pump speed limit, is provided by selection of cylinder bore diameter to journal diameter ratio.

It is contemplated that the invention concepts herein described may be variously otherwise embodied and it is intended that the appended claims be construed to include alternative embodiments of the invention insofar as limited by the prior art.

What is claimed is:

1. A method of controlling the circulation rate of glycol in a natural gas dehydration of the type having a dry glycol pumping unit which is driven by wet glycol entering the pumping unit from wet glycol inlet conduit in fluid communication with an absorber apparatus and discharged from the pumping unit through wet glycol outlet conduit in fluid communication with a drying apparatus, the speed of the pumping unit being controlled under ordinary operating conditions by a first control valve operatively associated with one of the wet glycol conduit and set to provide an optimum wet glycol flow rate for a normal well gas flow condition; the method comprising the steps of:
    (a) providing a second control valve in operative association with one of the wet glycol conduit;
    (b) continuously monitoring the temperature of glycol at a selected point in the dehydration system;
    (c) initially operating the glycol pumping unit at a normal pumping speed based upon the normal well gas flow rate;
    (d) progressively closing the second control valve to progressively slow the dry glycol pumping rate in response to an increasing dry glycol temperature above a preset threshold in a manner so as to prevent the dry glycol temperature from exceeding a preset maximum temperature and so as to maintain the pump speed at the highest pumping rate possible without exceeding the dry glycol preselected maximum temperature, the preset maximum temperature being sufficiently high to prevent pump stalling and to enable immediate effective operation of the system after resumption of normal well gas flow and being sufficiently low to prevent damage to the system;
    (e) progressively opening the second control valve to progressively increase the pumping rate up to the normal pumping speed as the temperature of the dry glycol decreases from an elevated value.

2. A fluid pumping system for use with a natural gas dehydrating system or the like having an absorber apparatus for removing water from wet natural gas to produce dry natural gas by use of a desiccant agent such as glycol, a glycol reboiler means for producing a source of dry glycol from wet glycol received from the absorber apparatus by heat obtained from burning of the natural gas, the system comprising:
    fluid pump means operatively connected between the dry glycol source and the absorber means for pumping dry glycol from the dry glycol source to the absorber means;
    said pump means comprising fluid operable pump actuating means for actuating said pump means said pump actuating means having fluid passage means including inlet fluid passage means for receiving wet glycol from said absorber and outlet fluid passage means for delivering wet glycol to said glycol reboiler means whereby energy derived from the wet glycol provides motivating force for operating said pump means;
    first control valve means for controlling the flow rate of wet glycol through said pump actuating means fluid passage means based upon the ordinary flow rate of well gas into the natural gas dehydration system;
    throttling thermostat means associated with a selected portion of the dehydration system for sensing the glycol temperature thereof and producing a control signal in response thereto;
    second control valve means responsive to said thermostat means control signal operatively associated with said pump actuating means fluid passage means for variably controlling the flow rate of fluid therethrough;
    said throttling thermostat means being adapted to operate said second control valve means during well gas low flow and no flow conditions to variably reduce the flow rate of wet glycol sufficiently to maintain said sensed dry glycol temperature substantially at a preselected maximum temperature setting which is sufficiently low to prevent damage to said dehydration system during well gas no flow and low flow operating conditions and being further adapted to variably open said control valve means when said sensed glycol temperature falls below said preselected maximum temperature setting whereby the wet glycol flow rate is returned to a rate determined by said first control valve means during normal well gas flow operating conditions;
    whereby dehydrating system glycol overheating is prevented and whereby stalling of said pump means associated with pump means stopping and restart operations and associated with extremely slow pumping is prevented and whereby relatively efficient dehydration system operation immediately after a well gas no flow or low flow condition is provided.

3. The invention of claim 2 wherein said thermostat means is positioned to sense the temperature of dry glycol.

4. The invention of claim 3 wherein said thermostat means is positioned to sense the dry glycol temperature proximate a cooling coil portion of said absorber apparatus.

* * * * *